US010574348B2

(12) United States Patent
Seo et al.

(10) Patent No.: US 10,574,348 B2
(45) Date of Patent: Feb. 25, 2020

(54) METHOD FOR TIME SYNCHRONIZATION BETWEEN COMMUNICATION NODES IN NETWORK

(71) Applicant: Hyundai Motor Company, Seoul (KR)

(72) Inventors: Kang Woon Seo, Seoul (KR); Dong Ok Kim, Gyeonggi-Do (KR); Jin Hwa Yun, Seoul (KR)

(73) Assignee: Hyundai Motor Company, Seoul (KR)

( * ) Notice: Subject to any disclaimer, the term of this patent is extended or adjusted under 35 U.S.C. 154(b) by 97 days.

(21) Appl. No.: 15/438,180

(22) Filed: Feb. 21, 2017

(65) Prior Publication Data

US 2017/0244477 A1     Aug. 24, 2017

(30) Foreign Application Priority Data

Feb. 23, 2016  (KR) .................. 10-2016-0021103

(51) Int. Cl.
*H04B 7/26* (2006.01)
*H04L 12/40* (2006.01)
*H04J 3/06* (2006.01)
*H04W 72/04* (2009.01)

(52) U.S. Cl.
CPC .......... *H04B 7/2671* (2013.01); *H04J 3/0667* (2013.01); *H04L 12/40* (2013.01); *H04W 72/0446* (2013.01); *H04L 2012/40273* (2013.01)

(58) Field of Classification Search
CPC ..... H04B 7/2671; H04L 7/00; H04W 72/0446
See application file for complete search history.

(56) References Cited

U.S. PATENT DOCUMENTS

| 2014/0169342 | A9* | 6/2014 | Ishihara | ................ | H04W 56/00 370/336 |
| 2015/0146713 | A1* | 5/2015 | Yang | ................ | H04W 56/0015 370/350 |

* cited by examiner

*Primary Examiner* — Rhonda L Murphy
(74) *Attorney, Agent, or Firm* — Mintz Levin Cohn Ferris Glovsky and Popeo, P.C.; Peter F. Corless

(57) ABSTRACT

Methods for time synchronization among communication nodes in a vehicle network are disclosed. An operation method of a first communication node includes: transmitting a first frame requesting verification of time synchronization to a second communication node; receiving a second frame including information indicating a link delay time of the second communication node from the second communication node; receiving a third frame including information indicating a transmission time of the second frame from the second communication node; and verifying time synchronization between the first and second communication nodes based on the information included in the received second and third frames.

10 Claims, 12 Drawing Sheets

FIG. 8

| | 800 | |
|---|---|---|
| 801 | DESTINATION ADDRESS | 6 OCTETS |
| 802 | SOURCE ADDRESS | 6 OCTETS |
| 803 | ETHERNET TYPE | 2 OCTETS |
| 804 | TRANSPORT SPECIFIC \| MESSAGE TYPE | 805 1 OCTET |
| 806 | RESERVED \| VERSION PTP | 807 1 OCTET |
| 808 | MESSAGE LENGTH | 2 OCTETS |
| 809 | DOMAIN NUMBER | 1 OCTET |
| 810 | RESERVED | 1 OCTET |
| 811 | FLAG | 2 OCTETS |
| 812 | ASYNCHRONOUS MAC ADDRESS | 8 OCTETS |
| 813 | TIME OVER FLAG | 4 OCTETS |
| 814 | SOURCE PORT IDENTIFIER | 10 OCTETS |
| 815 | SEQUENCE ID | 2 OCTETS |
| 816 | CONTROL | 1 OCTET |
| 817 | LOG MESSAGE INTERVAL | 1 OCTET |
| 818 | LINK DELAY TIME | 10 OCTETS |

FIG. 9

| | 900 | |
|---|---|---|
| 901 | DESTINATION ADDRESS | 6 OCTETS |
| 902 | SOURCE ADDRESS | 6 OCTETS |
| 903 | ETHERNET TYPE | 2 OCTETS |
| 904 | TRANSPORT SPECIFIC \| MESSAGE TYPE 905 | 1 OCTET |
| 906 | RESERVED \| VERSION PTP 907 | 1 OCTET |
| 908 | MESSAGE LENGTH | 2 OCTETS |
| 909 | DOMAIN NUMBER | 1 OCTET |
| 910 | RESERVED | 1 OCTET |
| 911 | FLAG | 2 OCTETS |
| 912 | CORRECTION | 8 OCTETS |
| 913 | RESERVED | 4 OCTETS |
| 914 | SOURCE PORT IDENTIFIER | 10 OCTETS |
| 915 | SEQUENCE ID | 2 OCTETS |
| 916 | CONTROL | 1 OCTET |
| 917 | LOG MESSAGE INTERVAL | 1 OCTET |
| 918 | TIME STAMP | 10 OCTETS |
| 919 | SUBSEQUENT INFORMATION TLV | 32 OCTETS |

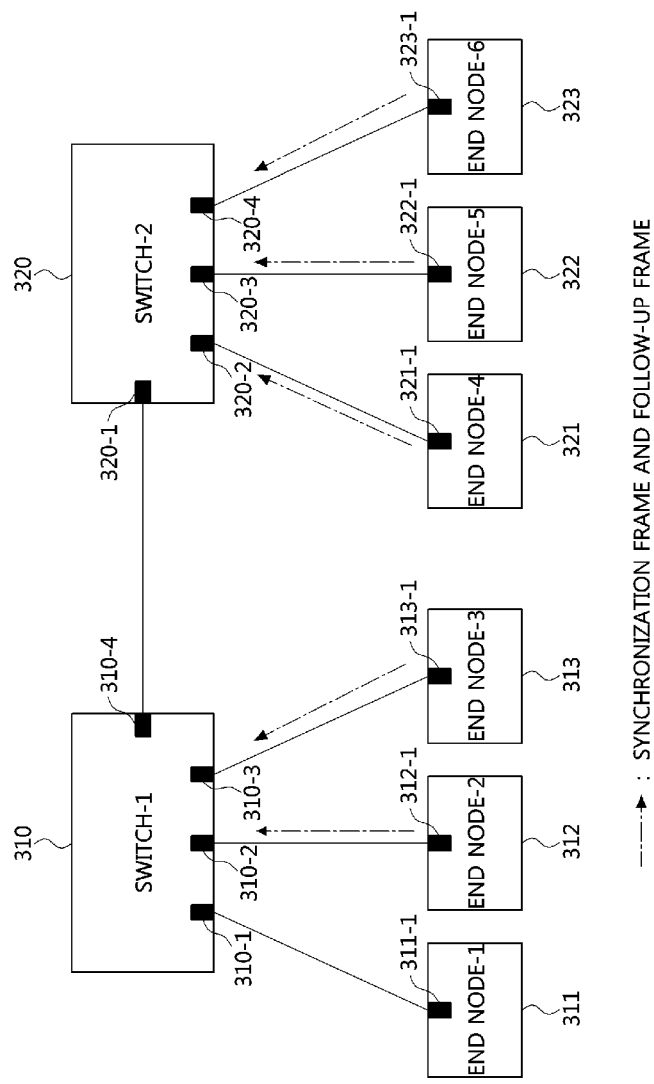

METHOD FOR TIME SYNCHRONIZATION BETWEEN COMMUNICATION NODES IN NETWORK

CROSS-REFERENCE TO RELATED APPLICATIONS

This application claims the benefit of and priority to Korean Patent Application No. 10-2016-0021103, filed on Feb. 23, 2016 in the Korean Intellectual Property Office (KIPO), the entirety of which is incorporated by reference as if fully set forth herein.

BACKGROUND

1. Technical Field

The present disclosure relates generally to methods for time synchronization, and more specifically, to methods for time synchronization between communication nodes in an automotive network.

2. Description of the Related Art

The number and variety of electronic devices installed within a vehicle have been increasing significantly along with the recent digitalization of vehicle parts. Electronic devices may currently be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices comprising each of these systems are connected via the vehicle network, which supports functions of the electronic devices. For instance, the CAN may support a transmission rate of up to 1 Mbps and may support automatic retransmission of colliding messages, error detection based on a cycle redundancy interface (CRC), or the like. The FlexRay-based network may support a transmission rate of up to 10 Mbps and may support simultaneous transmission of data through two channels, synchronous data transmission, or the like. The MOST-based network is a communication network for high-quality multimedia, which may support a transmission rate of up to 150 Mbps.

Meanwhile, the telematics system, the infotainment system, as well as enhanced safety systems of a vehicle require higher transmission rates and system expandability. However, the CAN, FlexRay-based network, and the like may not sufficiently support such requirements. The MOST-based network, in particular, may support a higher transmission rate than the CAN and the FlexRay-based network. However, applying the MOST-based network to vehicle networks can be costly.

Due to these limitations, an Ethernet-based network is often utilized as a vehicle network. The Ethernet-based network may support bi-directional communication through one pair of windings and may support a transmission rate of up to 10 Gbps. The Ethernet-based vehicle network may include a plurality of communication nodes. The communication node may be a gateway, a switch (or bridge), an end node, or the like.

Among the communication nodes, a master node may initialize a time synchronization procedure. The master node may be one of the gateways, switches, and end nodes. The master node may generate a synchronization frame including reference time information, and transmit the generated synchronization frame. At least one slave node among the communication nodes may receive the synchronization frame from the master node, and configure its time based on the reference time information included in the received synchronization frame. A method for verifying time synchronizations among the communication nodes is required after the time synchronization procedure is finished.

SUMMARY

The present disclosure provides a method of verifying time synchronization among communication nodes in a vehicle network.

In accordance with embodiments of the present disclosure, an operation method of a first communication node in an Ethernet-based vehicle network includes: transmitting a first frame requesting verification of time synchronization to a second communication node; receiving a second frame including information indicating a link delay time of the second communication node from the second communication node; receiving a third frame including information indicating a transmission time of the second frame from the second communication node; and verifying time synchronization between the first and second communication nodes based on the information included in the received second and third frames.

The second frame may further include information indicating a communication node in a synchronous state or in an asynchronous state. Also, the information indicating the communication node may include a flag indicating the synchronous state or the asynchronous state and an identifier of the communication node having a state indicated by the flag.

The verifying of time synchronization may further include: determining a sum of the link delay time and the transmission time as a time of the second communication node; and verifying the time synchronization based on a difference between a time of the first communication node and the time of the second communication node.

The first communication node may be determined as synchronized with the second communication node when the difference does not exceed a predetermined value, and the first communication node may be determined as not synchronized with the second communication node when the difference exceeds the predetermined value.

The operation method may further include: transmitting a fourth frame including a result of the verification of the time synchronization to a third communication node; and transmitting a fifth frame including information indicating a transmission time of the fourth frame to the third communication node.

The result of the verification may include a flag indicating a synchronous state or an asynchronous state and an identifier of a communication node having a state indicated by the flag.

The fourth frame may further include information indicating a link delay time of the first communication node.

The first communication node may be a master node.

The first frame may be transmitted after a completion of time synchronization among communication nodes.

Further, in accordance with embodiments of the present disclosure, an operation method of a first communication node in an Ethernet-based vehicle includes: receiving a first frame requesting verification of time synchronization from a second communication node; transmitting a second frame including information indicating a link delay time of the first communication node to the second communication node; and transmitting a third frame including information indicating a transmission time of the second frame to the second communication node.

The second frame may further include information indicating a communication node in a synchronous state or in an asynchronous state. Also, the information indicating the communication node may include a flag indicating the synchronous state or the asynchronous state and an identifier of the communication node having a state indicated by the flag.

The second communication node may be a master node.

According to embodiments of the present disclosure, time synchronization among communication nodes constituting a vehicle network can be verified after completion of a time synchronization procedure. Communication nodes in asynchronous state can be identified through the time synchronization verification, and a time synchronization procedure for the communication nodes in asynchronous state can be performed again. As a result, performance of the vehicle network can be enhanced.

BRIEF DESCRIPTION OF DRAWINGS

Embodiments of the present disclosure will become more apparent by describing in detail forms of the present disclosure with reference to the accompanying drawings, in which:

FIG. 8 is a block diagram illustrating a synchronization frame according to embodiments of the present disclosure;

FIG. 9 is a block diagram illustrating a follow-up frame according to embodiments of the present disclosure;

FIG. 10 is a block diagram illustrating an example of transmission of a synchronization frame and a follow-up frame in an end node of a vehicle network according to embodiments of the present disclosure;

Figure 1:
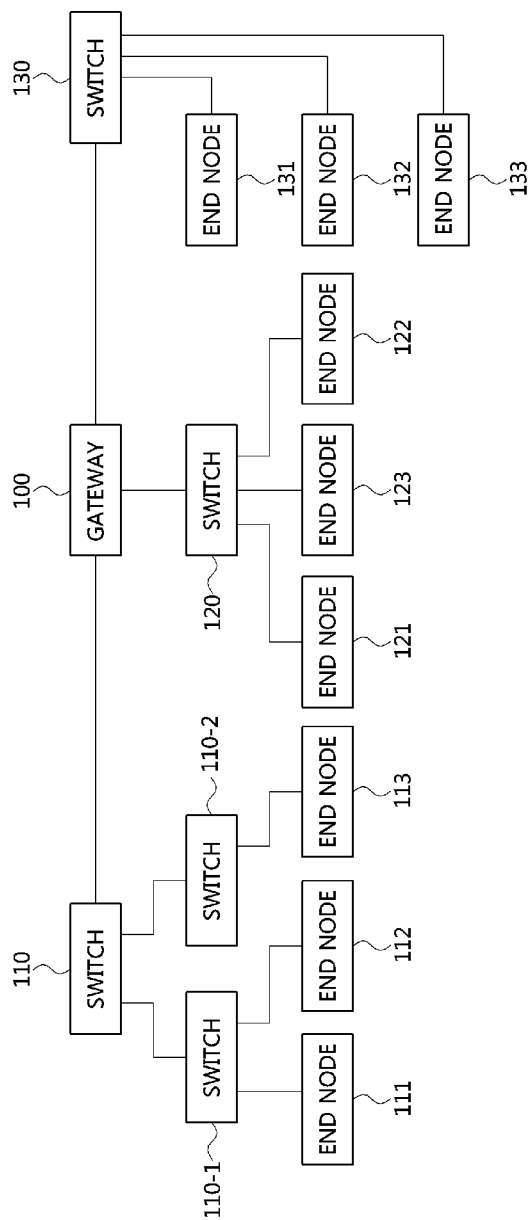
FIG. 1 is a diagram showing a vehicle network topology according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller unit/control unit may perform one or more of the processes described further below, and the term controller unit/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Further, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram showing a vehicle network topology according to embodiments of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Embodiments of the present disclosure may be applied to the foregoing network topologies. The network topology to which forms of the present disclosure may be applied is not limited thereto and may be configured in various ways.

Figure 2:
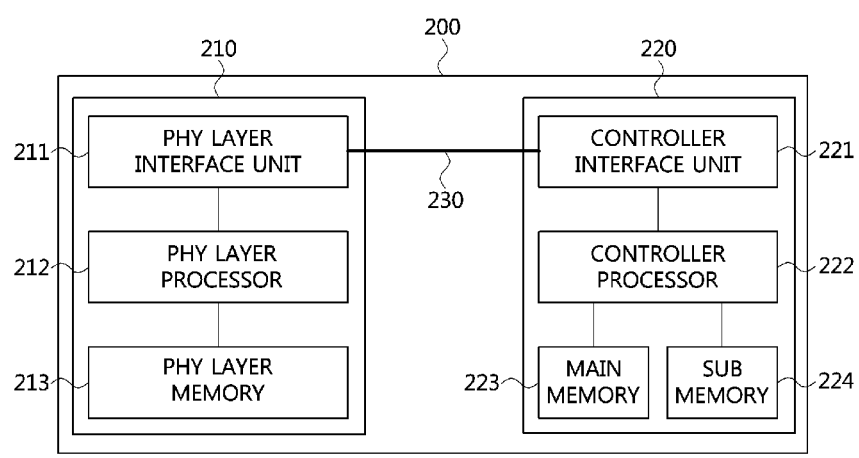
FIG. 2 is a diagram showing a communication node constituting a vehicle network according to embodiments of the present disclosure.

FIG. 2 is a diagram showing a communication node constituting a vehicle network according to embodiments of the present disclosure. Notably, the various methods discussed herein below may be executed by a controller unit having a processor and a memory.

As shown in FIG. 2, a communication node 200 of a network may include a PHY layer unit 210 and a controller unit 220. In addition, the communication node 200 may further include a regulator (not shown) for supplying power. In particular, the controller unit 220 may be implemented to include a medium access control (MAC) layer. A PHY layer unit 210 may be configured to receive or transmit signals from or to another communication node. The controller unit 220 may be configured to control the PHY layer unit 210 and perform various functions (e.g., an infotainment function, or the like.). The PHY layer unit 210 and the controller unit 220 may be implemented as one system on chip (SoC), or alternatively may be implemented as separate chips.

Further, the PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller unit 220 to the PHY layer processor 212 and transmit a signal received from the PHY layer processor 212 to the controller unit 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface unit 221, a controller processor 222, a main memory 223, and a sub memory 224. The configuration of the controller unit 220 is not limited thereto, and the controller unit 220 may be configured in various ways. The controller interface unit 221 may be configured to receive a signal from the PHY layer unit 210 (e.g., the PHY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for controlling the controller interface unit 221, the main memory 223, and the sub memory 224. The memory control logic may be implemented to be included in the main memory 223 and the sub memory 224 or may be implemented to be included in the controller processor 222.

Further, each of the main memory 223 and the sub memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The sub memory 224 may be a non-volatile memory in which an operating system code (e.g., a kernel and a device driver) and an application program code for performing a function of the controller unit 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node will be described below, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
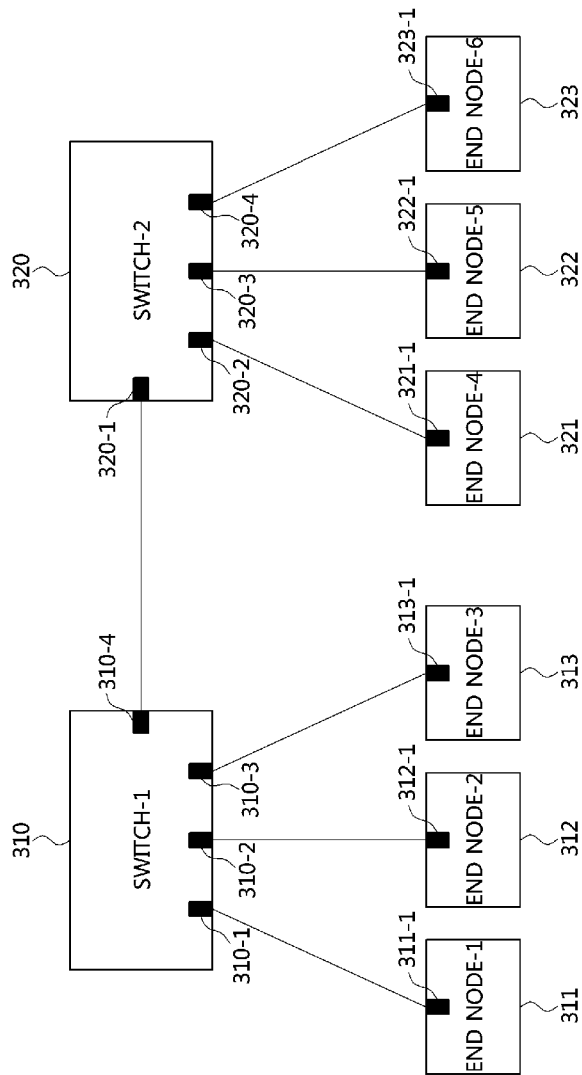
FIG. 3 is a diagram showing another vehicle network topology according to embodiments of the present disclosure.

FIG. 3 is a diagram showing another vehicle network topology according to embodiments of the present disclosure.

As shown in FIG. 3, a vehicle network topology may comprise a plurality of switches 310 and 320, and end nodes 311, 312, 313, 321, 322, and 323 which are respectively connected to the switches 310 and 320. Each of the switches 430 and 423, and the end nodes 311, 312, 313, 321, 322, and 333 may have a structure identical to or similar with that of the communication node 200 described referring to FIG. 2.

The first switch 310 may comprise a plurality of ports 310-1, 310-2, 310-3, and 310-4. The first port 310-1 of the switch 310 may be connected to a first port 311-1 of the first end node 311, and a link may be formed between the port 310-1 and the port 311-1. The second port 310-2 of the switch 310 may be connected to a first port 312-2 of the second end node 312, and a link may be formed between the port 310-2 and the port 312-1. The third port 310-3 of the first switch 310 may be connected to a first port 313-1 of the third end node 313, and a link may be formed between the port 410-3 and the port 413-1. The fourth port 310-4 of the switch 310 may be connected to a first port 320-1 of the switch 320, and a link may be formed between the port 310-4 and the port 320-1.

The second switch 320 may comprise a plurality of ports 320-1, 320-2, 320-3, and 320-4. The second port 320-2 of the switch 320 may be connected to a first port 321-1 of the fourth end node 321, and a link may be formed between the port 320-2 and the port 321-1. The third port 320-3 of the second switch 320 may be connected to a first port 322-1 of the fifth end node 322, and a link may be formed between the port 320-3 and the port 322-1. The fourth port 320-4 of the second switch 320 may be connected to a first port 323-1 of the sixth end node 323, and a link may be formed between the port 320-4 and the port 323-1.

Hereinafter, a method for time synchronization among communication nodes, a method for calculating link delay time between communication nodes, and a method for verifying time synchronization among communication nodes will be described based on the vehicle network illustrated in FIG. 3.

Figure 4:
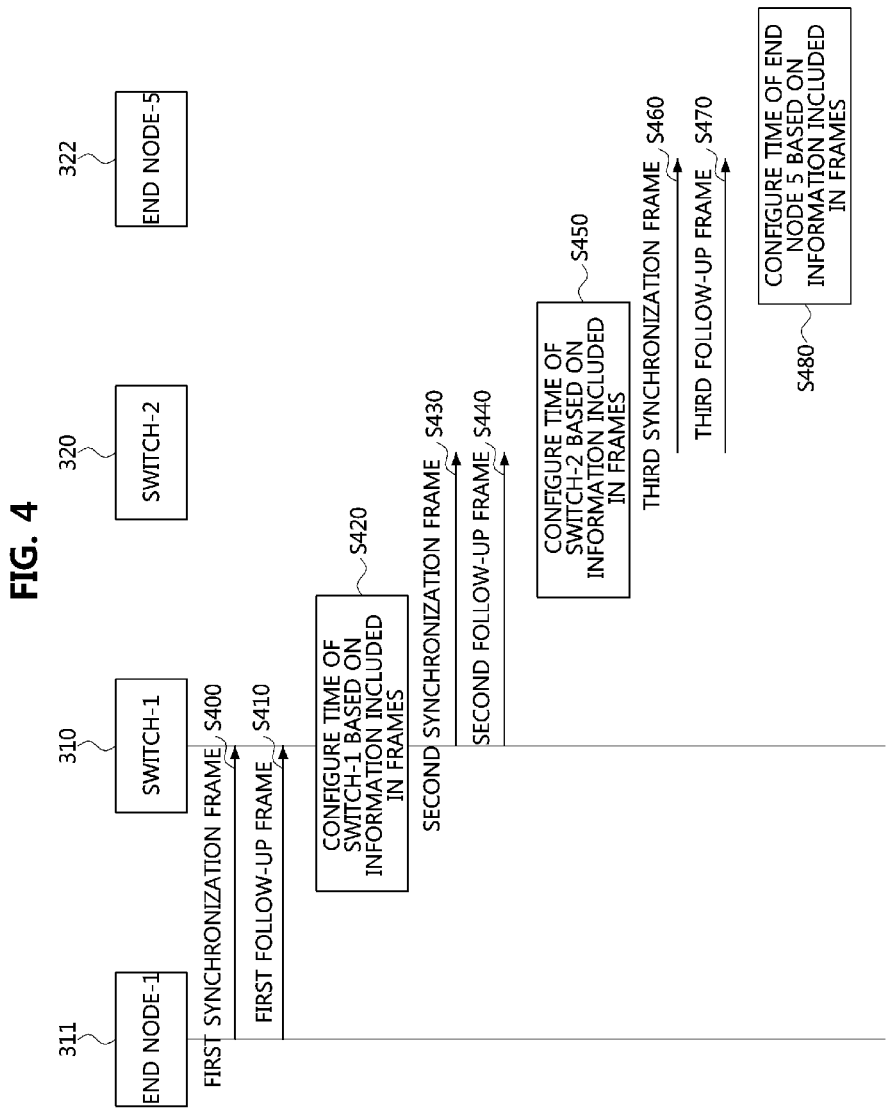
FIG. 4 is a sequence chart illustrating a method for time synchronization according to embodiments of the present disclosure.

FIG. 4 is a sequence chart illustrating a method for time synchronization according to embodiments of the present disclosure.

As shown in FIG. 4, each of the switches 310 and 320, and each of the end nodes 311 and 322 may have a structure identical to or similar with that of the communication node 200 described referring to FIG. 2. Also, the switches 310 and 320, and the end nodes 311 and 322 may constitute the vehicle network as illustrated in FIG. 3. The switches 310 and 320, and the end nodes 311 and 322 may support an IEEE 802.11AS protocol. The end node 311 may operate as a master node, and the switches 310 and 320, and the end node 322 may operate as slave nodes.

The end node 311 may generate a first synchronization frame including information on link delay time (hereinafter, referred to as "link delay time information"), and transmit the generated first synchronization frame to the switch 310 (S400). The link delay time information may indicate time required for transmission of a frame between communication nodes (e.g., time required for transmission of a frame between the end node 311 and the switch 310). The end node 311 may record transmission time information of the first synchronization frame (i.e., information on the time at which the first synchronization frame is transmitted), generate a first follow-up frame including the transmission time of the first synchronization frame, and transmit the generated first follow-up frame to the switch 310 (S410). The first follow-up frame may be transmitted immediately after transmitting the first synchronization frame.

The switch 310 may receive the first synchronization frame and the first follow-up frame from the end node 311, and obtain the link delay time information and the transmission time information of the first synchronization frame from the received frames. The switch 310 may configure time of the switch 310 with "the transmission time of the first synchronization frame+the link delay time" (S420). Then, the switch 310 may generate a second synchronization frame including the link delay time information, and transmit the generated second synchronization frame to the switch 320 (S430). The switch 310 may record transmission time information of the second synchronization frame, generate a second follow-up frame including the transmission time information of the second synchronization frame, and transmit the generated second follow-up frame to the switch 320 (S440). The second follow-up frame may be transmitted immediately after transmitting the second synchronization frame.

The switch 320 may receive the second synchronization frame and the second follow-up frame from the switch 310, and obtain the link delay time information and the transmission time information of the second synchronization frame from the received frames. The switch 320 may configure time of the switch 320 with "the transmission time of the second synchronization frame+the link delay time" (S450). Then, the switch 320 may generate a third synchronization frame including the link delay time information, and transmit the generated third synchronization frame to the end node 322 (S460). The switch 320 may record transmission time information of the third synchronization frame, generate a third follow-up frame including the transmission time information of the third synchronization frame, and transmit the generated third follow-up frame to the end node 322 (S470). The third follow-up frame may be transmitted immediately after transmitting the third synchronization frame.

The end node 322 may receive the third synchronization frame and the third follow-up frame from the switch 320, and obtain the link delay time information and the transmission time information of the third synchronization frame from the received frames. The end node 322 may configure time of the end node 322 with "the transmission time of the third synchronization frame+the link delay time" (S480).

Meanwhile, other communication nodes constituting the vehicle network (e.g., the end nodes 312, 313, 321, and 323, etc.) may also perform the above-described time synchronization based on the time of the end node 311. Through these, time synchronization among the communication nodes constituting the vehicle network can be established.

Figure 5:
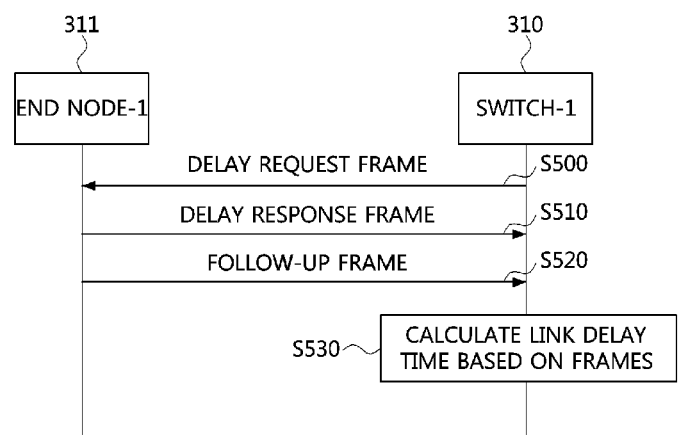
FIG. 5 is a sequence chart illustrating a method for calculating a link delay time according to embodiments of the present disclosure.

FIG. 5 is a sequence chart illustrating a method for calculating a link delay time according to embodiments of the present disclosure.

As shown in FIG. 5, each of the switch 310 and the end node 311 may have a structure identical to or similar with that of the communication node 200 described with reference to FIG. 2. Also, the switch 310 and the end node 311 may constitute the vehicle network as illustrated in FIG. 3. The switch 310 and the end node 311 may support IEEE 802.11AS protocol. The switch 310 may operate as a master node, and the end node 311 may operate as a slave node. Alternatively, the switch 310 may operate as a slave node, and the end node 311 may operate as a master node. Here, it is assumed that time of the switch 310 is synchronized with time of the end node 311.

The switch 310 may generate a delay request frame, and transmit the generated delay request frame to the end node 311 (S500). The switch 310 may record transmission time of the delay request frame (hereinafter, referred to as "time1"). The end node 311 may receive the delay request frame from the switch 310, and identify reception time of the delay request frame (hereinafter, referred to as "time2").

The end node 311 may generate a delay response frame including information indicating the time2, and transmit the generated delay response frame to the switch 310 (S510). The end node 311 may record transmission time of the delay response frame (hereinafter, referred to as "time3"), and generate a follow-up frame including information indicating the time3. The end node 311 may transmit the follow-up frame to the switch 310 (S520). The follow-up frame may be transmitted immediately after transmitting the delay response frame.

The switch 310 may receive the delay response frame from the end node 311, identify the time2 based in the information included in the received delay response frame, and record reception time of the delay response frame (hereinafter, referred to as "time4"). The switch 310 may receive the follow-up message from the end node 311, and identify the time3 based on the information included in the received follow-up frame.

The switch 310 may calculate the link delay time between two communication nodes by using the below Equation 1 (S530). The switch 310 may notify information indicating the calculated link delay time to other communication nodes.

$$\text{Link delay time} = \{(\text{time4}-\text{time1})-(\text{time3}-\text{time2})\}/2 \quad \text{[Equation 1]}$$

Meanwhile, after the above-described time synchronization procedure among the communication nodes in the vehicle network ends, a method for verifying time synchronization may be performed as explained below. Here, a method for verifying the time synchronization will be explained with reference to the end nodes 311 and 322. The time synchronization verification between the end node 311 and the other end node 312, 313, 321, or 323 may be performed identically to or similarly with the time synchronization verification between the end nodes 311 and 322.

Figure 6:
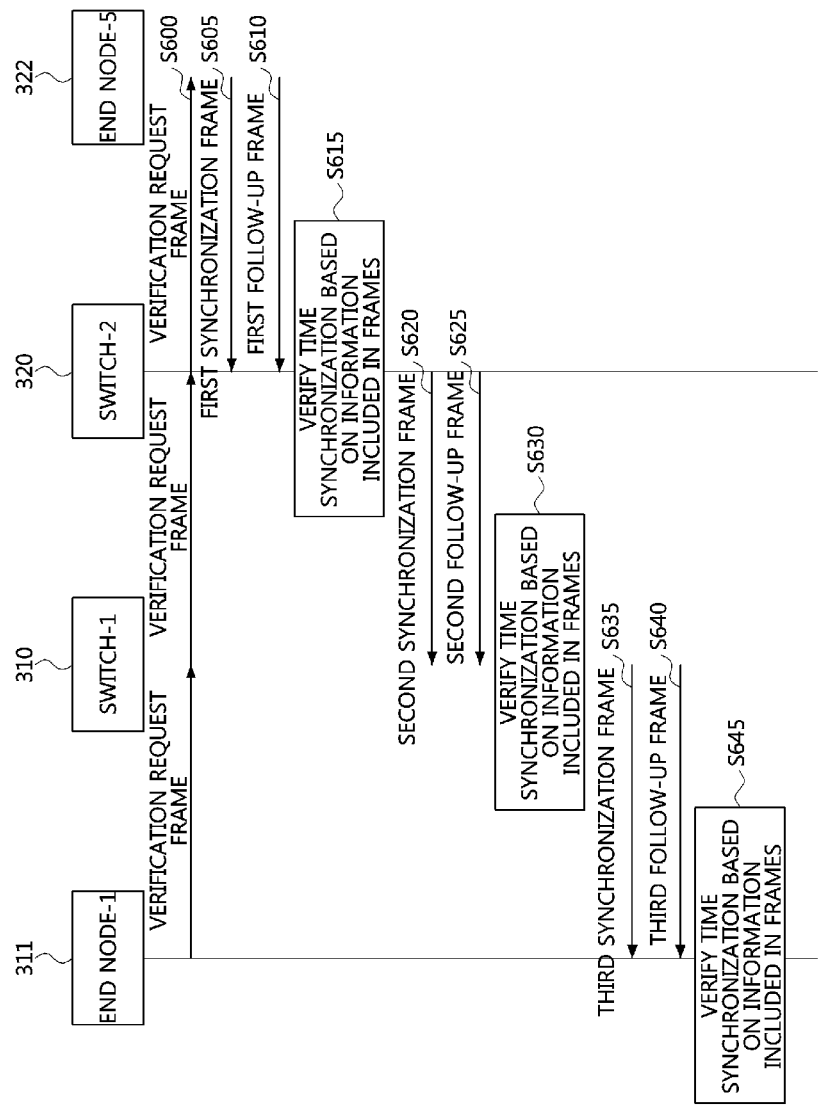
FIG. 6 is a sequence chart illustrating a method for verifying time synchronization according to embodiments of the present disclosure.

FIG. 6 is a sequence chart illustrating a method for verifying time synchronization according to embodiments of the present disclosure.

As shown in FIG. 6, each of the switches 310 and 320, and each of the end nodes 311 and 322 may have a structure identical to or similar with that of the communication node 200 described with reference to FIG. 2. Also, the switches 310 and 320, and the end nodes 311 and 322 may constitute the vehicle network as illustrated in FIG. 3. The switches 310 and 320, and the end nodes 311 and 322 may support IEEE 802.11AS protocol. The end node 311 may operate as a master node, and the switches 310 and 320, and the end node 322 may operate as slave nodes. Also, it is assumed that uplink delay time between communication nodes may be identical to downlink delay time between communication nodes.

A procedure for the time synchronization verification may be initialized by the master node or one of the other communication nodes (e.g., an on-board diagnostic (OBD) apparatus). The end node 311 may generate a verification request frame requesting verification of time synchronization, and transmit the generated verification request frame to the end node 322 (S600). The verification request frame may be transmitted to the end node 322 through the switch 310 and the switch 320. Also, the end node 311 may transmit a verification request frame to other end nodes constituting the vehicle network (e.g., the end nodes 312, 313, 321, and 323, etc.). A detail of the transmission of the verification request frame will be explained as follows.

Figure 7:
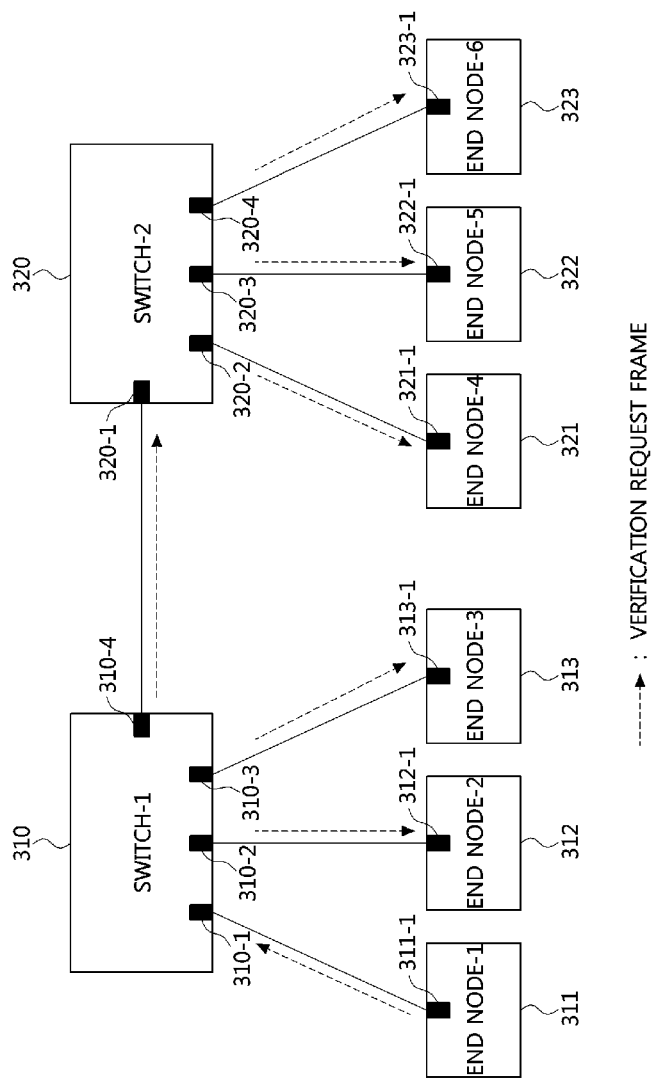
FIG. 7 is a block diagram illustrating transmission of a verification request frame in a vehicle network according to embodiments of the present disclosure.

FIG. 7 is a block diagram illustrating transmission of a verification request frame in a vehicle network according to embodiments of the present disclosure.

As shown in FIG. 7, the end node 311 may generate a verification request frame requesting verification of time synchronization, and transmit the generated verification request frame to the switch 310. The switch 310 may receive the verification request frame from the end node 311, and transmit the received verification request frame to the switch 320, the end node 312, and the end node 313. The switch 320 may receive the verification request frame from the switch 310, and transmit the received verification request frame to the end nodes 321, 322, and 323.

Referring once again to FIG. 6, the end node 322 may receive the verification request frame from the switch 320. The end node 322 may identify that the time synchronization verification has been requested based on the verification request frame. Thus, the end node 322 may generate a first synchronization frame including information indicating a link delay time. The synchronization frame used for the time synchronization verification may be composed as follows.

FIG. 8 is a block diagram illustrating a synchronization frame according to embodiments of the present disclosure.

As shown in FIG. 8, a synchronization frame 800 may comprise a destination address field 801 having a size of 6 octets, a source address field 802 having a size of 6 octets, an Ethernet-type field 803 having a size of 2 octets, a transport specific field 804 having a size of 4 bits, a message type field 805 having a size of 4 bits, a reserved field 806 having a size of 4 bits, a version precision time protocol (PTP) field 807 having a size of 4 bits, a message length field 808 having a size of 2 octets, a domain number field 809 having a size of 1 octet, a reserved field 810 having a size of 1 octet, a flag field 811 having a size of 2 octets, an asynchronous MAC address field 812 having a size of 8 octets, a time over flag field 813 having a size of 4 octets, a source port identifier field 814 having a size of 10 octets, a sequence ID field 815 having a size of 2 octets, a control field 816 having a size of 1 octet, a log message interval field 817 having a size of 1 octet, and a link delay time field 818 having a size of 10 octets.

The asynchronous MAC address field 812 may include an identifier of a communication node (e.g., a MAC address). For example, the asynchronous MAC address field 812 may include an identifier of a communication node having a flag indicated by the time over flag field 813. In a case that the time over flag field 813 indicates synchronous state, the asynchronous MAC address field 812 may not be configured. In a case that the time over flag field 813 indicates asynchronous state, the asynchronous MAC address field 812 may include an identifier of a corresponding communication node in asynchronous state.

The time over flag field 813 may indicate time difference between communication nodes. If the time difference between communication nodes does not exceed a predetermined value, the time over flag field 813 may be set to '0'. The time over flag field 813 configured as '0' may indicate that the corresponding communication node is in the synchronous state. If the time difference between communication nodes exceeds the predetermined value, the time over flag field 813 may be set to '1'. The time over flag field 813 configured as '1' may indicate that the corresponding communication node is in the asynchronous state. The time over flag field 813 may be configured in various manners, without being restricted to the above-described configuration manner. The link delay time field 818 may indicate the link delay time between communication nodes.

Referring once again to FIG. 6, the asynchronous MAC address field 812 and the time over flag field 813 of the first synchronization frame may not be configured. The link delay time field 818 of the first synchronization frame may indicate a link delay time at the end node 322. The end node 322 may transmit the first synchronization frame to the direction of the end node 311 having requested verification of time synchronization. For example, the end node 322 may transmit the first synchronization frame to the switch 320 (S605). The end node 322 may record the transmission time of the first synchronization frame, and generate a first follow-up frame including information indicating the transmission time of the first synchronization information (hereinafter, referred to as "transmission time information"). The follow-up frame used for the time synchronization verification may be configured as follows.

FIG. 9 is a block diagram illustrating a follow-up frame according to embodiments of the present disclosure.

As shown in FIG. 9, a follow-up frame 900 may comprise a destination address field 901 having a size of 6 octets, a source address field 902 having a size of 6 octets, an Ethernet-type field 903 having a size of 2 octets, a transport specific field 904 having a size of 4 bits, a message type field 905 having a size of 4 bits, a reserved field 906 having a size of 4 bits, a version PTP field 907 having a size of 4 bits, message length field 908 having a size of 2 octets, a domain number field 909 having a size of 1 octet, a reserved field 910 having a size of 1 octet, a flag field 911 having a size of 2 octets, a correction field 912 having a size of 8 octets, a reserved field 913 having a size of 4 octets, a source port identifier field 914 having a size of 10 octets, a sequence ID field 915 having a size of 2 octets, a control field 916 having a size of 1 octet, a log message interval field 917 having a size of 1 octet, a time stamp field 918 having a size of 10 octets, and a subsequent information time-length-value (TLV) field 919. The time stamp field 918 may indicate the transmission time of the synchronization frame 800 corresponding to the follow-up frame 900.

Referring once again to FIG. 6, the time stamp field 918 included in the first follow-up frame may indicate the transmission time of the first synchronization frame. The end node 322 may transmit the first follow-up frame to the direction of the end node 311 having requested verification of time synchronization. For example, the end node 322 may transmit the first follow-up frame to the switch 320 (S610). The first follow-up frame may be transmitted immediately after the transmission of the first synchronization frame. Detail of the transmission of the synchronization frame and follow-up frame in the end nodes 312, 313, 321, 322, and 323 may be configured as follows.

FIG. 10 is a block diagram illustrating an example of transmission of a synchronization frame and a follow-up frame in an end node of a vehicle network according to embodiments of the present disclosure.

As shown in FIG. 10, the end node 312 may generate a synchronization frame and a follow-up frame after receiving a verification request frame, and transmit the synchronization frame and the follow-up frame to the switch 310. The synchronization frame may include information on link delay time at the end node 312. The follow-up frame may include information on transmission time of the synchronization frame transmitted from the end node 312. The end node 313 may generate a synchronization frame and a follow-up frame after receiving the verification request frame, and transmit the synchronization frame and the follow-up frame to the switch 310. The synchronization frame may include information on link delay time at the end node 313. The follow-up frame may include information on transmission time of the synchronization frame transmitted from the end node 313.

The end node 321 may generate a synchronization frame and a follow-up frame after receiving the verification request frame, and transmit the synchronization frame and the follow-up frame to the switch 320. The synchronization frame may include information on link delay time at the end node 321. The follow-up frame may include information on transmission time of the synchronization frame transmitted from the end node 321. The end node 322 may generate a synchronization frame and a follow-up frame after receiving the verification request frame, and transmit the synchronization frame and the follow-up frame to the switch 320. The synchronization frame may include information on link delay time at the end node 322. The follow-up frame may include information on transmission time of the synchronization frame transmitted from the end node 322. The end node 323 may generate a synchronization frame and a follow-up frame after receiving the verification request frame, and transmit the synchronization frame and the follow-up frame to the switch 320. The synchronization frame may include information on link delay time at the end node 323. The follow-up frame may include information on transmission time of the synchronization frame transmitted from the end node 323.

Referring once again to FIG. 6, the switch 320 may receive the first synchronization frame and the first follow-up frame from the end node 322. The switch 320 may verify time synchronization between the switch 320 and the end node 322 based on the information included in the first synchronization frame and the first follow-up frame (S615). First, the switch 320 may obtain the link delay time information of the end node 322 from the first synchronization frame, and the transmission time information of the first synchronization frame from the first follow-up frame. The switch 320 may determine time of the end node 322 as "the transmission time of the first synchronization frame+the link delay time at the end node 322".

The switch 320 may calculate time difference between the switch 320 and the end node 322, and identify time synchronization between the switch 320 and the end node 322 based on the time difference. For example, in a case that the calculated time difference does not exceed a predetermined value, the switch 320 may be determined as synchronized with the end node 322, and the time over flag field may be set to '0'. On the contrary, in a case that the calculated time difference exceeds the predetermined value, the switch 320 may be determined as not synchronized with the end node 322, and the time over flag field may be set to '1'.

The switch 320 may generate a second synchronization frame. The second synchronization frame may have a structure identical to or similar with that of the synchronization frame 800 explained with reference to FIG. 8. The time over flag field 813 of the second synchronization frame may be set to '0' when the switch 320 is determined as synchronized with the end node 322. The time over flag field 813 of the second synchronization frame may be set to '1' when the switch 320 is determined as not synchronized with the end node 322.

The asynchronous MAC address field 812 of the second synchronization frame may include an identifier of a communication node (e.g., the switch 320) having a flag indicated by the time over flag field 813. In the case that the switch 320 is determined as synchronized with the end node 322, the asynchronous MAC address field 812 may not be configured. In the case that the switch 320 is determined as not synchronized with the end node 322, the asynchronous MAC address field 812 may include an identifier of the switch 320. The link delay time field 818 of the second synchronization frame may include information on a link delay time at the switch 320.

The switch 320 may transmit the second synchronization frame to the direction of the end node 311 having requested verification of time synchronization (S620). For example, the switch 320 may transmit the second synchronization frame to the switch 310. The switch 320 may record the transmission time of the second synchronization frame, and generate a second follow-up frame including information indicating the transmission time of the second synchronization frame. The time stamp field 918 of the second follow-up frame may include the transmission time information of the second synchronization frame. Here, the second follow-up frame may be identical to the follow-up frame 900 explained referring to FIG. 9. The switch 320 may transmit the second follow-up frame to the direction of the end node 311 having requested verification of time synchronization (S625). For example, the switch 320 may transmit the second follow-up frame to the switch 310. Detail of the transmission of the synchronization frame and follow-up frame in the switches 310 and 320 may be configured as follows.

Figure 11:
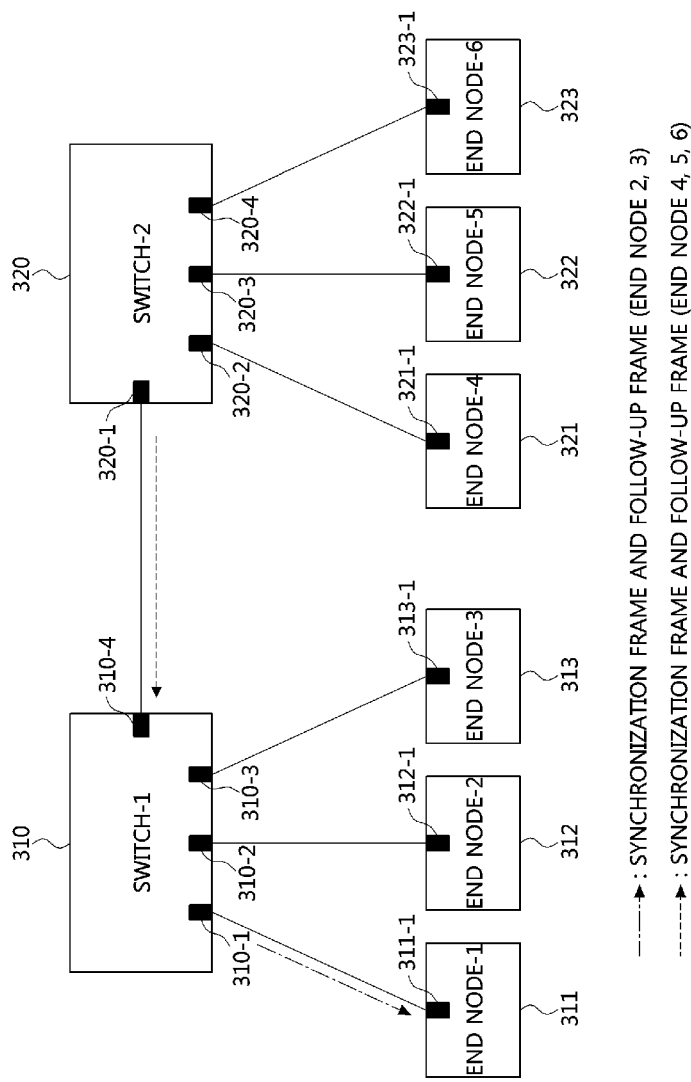
FIG. 11 is a block diagram illustrating an example of transmission of a synchronization frame and a follow-up frame in a switch of a vehicle network according to embodiments of the present disclosure.

FIG. 11 is a block diagram illustrating an example of transmission of a synchronization frame and a follow-up frame in a switch of a vehicle network according to embodiments of the present disclosure.

As shown in FIG. 11, the switch 310 may verify the time synchronization between the switch 310 and the end node 312 based on the information included in the synchronization frame and the follow-up frame received from the end node 312. The switch 310 may generate a synchronization frame including a verification result of time synchronization such as the asynchronous MAC address, the time over flag, etc. and the information on the link delay time at the switch 310, and transmit the generated synchronization frame to the end node 311. Then, the switch 310 may transmit a follow-up frame including the transmission time information of the synchronization frame to the end node 311.

Also, the switch 310 may verify the time synchronization between the switch 310 and the end node 313 based on the information included in the synchronization frame and the follow-up frame received from the end node 313. The switch 310 may generate a synchronization frame including a verification result of time synchronization such as the asynchronous MAC address, the time over flag, etc. and the information on the link delay time at the switch 310, and transmit the generated synchronization frame to the end node 311. Then, the switch 310 may transmit a follow-up frame including the transmission time information of the synchronization frame to the end node 311.

Meanwhile, the switch 310 may multiplex the time synchronization verification result for the end node 312 and the time synchronization verification result for the end node 313 in a single synchronization frame, and transmit the synchronization frame where the time synchronization verification results for two end nodes are multiplexed to the end node 311. The multiplexed synchronization frame may further include information on the link delay time at the switch 310. The follow-up frame may be transmitted after the transmission of the multiplexed synchronization frame.

The switch 320 may verify the time synchronization between the switch 320 and the end node 321 based on the information included in the synchronization frame and the follow-up frame received from the end node 321. The switch 320 may generate a synchronization frame including a verification result of time synchronization such as the asynchronous MAC address, the time over flag, etc. and the information on the link delay time at the switch 320, and transmit the generated synchronization frame to the switch 310. Then, the switch 320 may transmit a follow-up frame including the transmission time information of the synchronization frame to the switch 310.

Also, the switch 320 may verify the time synchronization between the switch 320 and the end node 322 based on the information included in the synchronization frame and the follow-up frame received from the end node 322. The switch 320 may generate a synchronization frame including a result of the time synchronization verification such as the asynchronous MAC address, the time over flag, etc. and the information on the link delay time at the switch 320, and transmit the generated synchronization frame to the switch 310. Then, the switch 320 may transmit a follow-up frame including the transmission time information of the synchronization frame to the switch 310.

The switch 320 may verify the time synchronization between the switch 320 and the end node 323 based on the information included in the synchronization frame and the follow-up frame received from the end node 323. The switch 320 may generate a synchronization frame including a verification result of time synchronization such as the asynchronous MAC address, the time over flag, etc. and the information on the link delay time at the switch 320, and transmit the generated synchronization frame to the switch 310. Then, the switch 320 may transmit a follow-up frame including the transmission time information of the synchronization frame to the switch 310.

Meanwhile, the switch 320 may multiplex the time synchronization verification result for the end node 321 and the time synchronization verification result for the end node 322 in a single synchronization frame, and transmit the synchronization frame where the time synchronization verification results for two end nodes are multiplexed to the switch 310. The multiplexed synchronization frame may further include information on the link delay time at the switch 320. The follow-up frame may be transmitted after the transmission of the multiplexed synchronization frame.

Referring once again to FIG. 6, the switch 310 may receive the second synchronization frame and the second follow-up frame from the switch 320. The switch 310 may verify time synchronization between the switch 310 and the switch 320 based on the information included in the second synchronization frame and the second follow-up frame (S630). First, the switch 310 may obtain the link delay time information of the switch 320 from the second synchronization frame, and the transmission time information of the second synchronization frame from the second follow-up frame. For example, the switch 310 may determine time of the switch 320 as 'the transmission time of the second synchronization frame+the link delay time at the switch 320'.

The switch 310 may calculate time difference between the switch 310 and the switch 320, and identify time synchronization between the switch 310 and the switch 320 based on the time difference. For example, in a case that the calculated time difference does not exceed a predetermined value, the switch 310 may be determined as synchronized with the switch 320 and the time over flag field may be set to '0'. On the contrary, in a case that the calculated time difference exceeds the predetermined value, the switch 310 may be determined as not synchronized with the switch 320, and the time over flag field may be set to '1'.

The switch 310 may generate a third synchronization frame. The third synchronization frame may have a structure identical to or similar with that of the synchronization frame 800 explained with reference to FIG. 8. The time over flag field 813 of the third synchronization frame may be set to '0' when the switch 310 is determined as synchronized with the switch 320. The time over flag field 813 of the third synchronization frame may be set to '1' when the switch 310 is determined as not synchronized with the switch 320.

The asynchronous MAC address field 812 of the third synchronization frame may include an identifier of a communication node (e.g., the switch 310) having a flag indicated by the time over flag field 813. In the case that the switch 310 is determined as synchronized with the switch 320, the asynchronous MAC address field 812 may not be configured. In the case that the switch 310 is determined as not synchronized with the switch 320, the asynchronous MAC address field 812 may include an identifier of the switch 310. The link delay time field 818 of the third synchronization frame may include information on a link delay time at the switch 310. Also, the third synchronization frame may further include the asynchronous MAC address and the time over flag included in the second synchronization frame.

The switch 310 may transmit the third synchronization frame to the end node 311 having requested the time synchronization verification (S635). The switch 310 may record the transmission time of the third synchronization frame, and generate a third follow-up frame including information indicating the transmission time of the third synchronization information. The time stamp field 918 of the third follow-up frame may include the transmission time information of the third synchronization frame. Here, the third follow-up frame may be identical to the follow-up frame 900 explained referring to FIG. 9. The switch 310 may transmit the third follow-up frame to the end node 311 having requested the time synchronization verification (S640). Detail of the transmission of the synchronization frame and follow-up frame in the switch 310 may be configured as follows.

Figure 12:
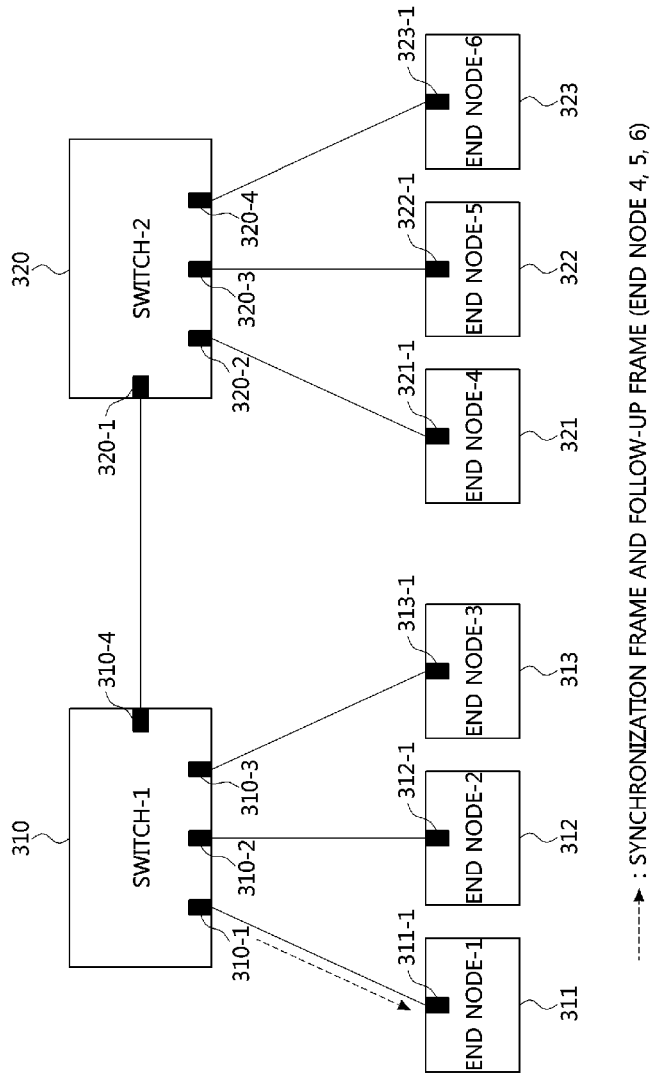
FIG. 12 is a block diagram illustrating another example of transmission of a synchronization frame and a follow-up frame in a switch of a vehicle network according to embodiments of the present disclosure.

FIG. 12 is a block diagram illustrating another example of transmission of a synchronization frame and a follow-up frame in a switch of a vehicle network according to embodiments of the present disclosure.

As shown in FIG. 12, the switch 310 may verify the time synchronization between the switch 310 and the switch 320 based on the information included in the synchronization frame and the follow-up frame received from the switch 320. The switch 310 may generate a synchronization frame include a result of the time synchronization verification such as the asynchronous MAC address, the time over flag, etc. and the information on the link delay time at the switch 310. Also, the synchronization frame may further include the asynchronous MAC address and the time over flag (e.g., a verification result of verification on time synchronization between the switch 320 and end node 321, 322, or 323 connected to the switch 320) included in the synchronization frame received from the switch 320. The switch 310 may transmit the synchronization frame to the end node 311. Then, the switch 310 may transmit a follow-up frame including the transmission time information of the synchronization frame to the end node 311.

Referring once again to FIG. 6, the end node 311 may receive the third synchronization frame and the third follow-up frame from the switch 310. The end node 311 may verify time synchronization among the communication nodes constituting the vehicle network based on the information included in the third synchronization frame and the third follow-up frame (S645). First, the end node 311 may obtain the link delay time information of the switch 310 from the third synchronization frame, and the transmission time information of the third synchronization frame from the third follow-up frame. The end node 311 may determine time of the switch 310 as 'the transmission time of the third synchronization frame+the link delay time at the switch 310'.

The end node 311 may calculate time difference between the end node 311 and the switch 310, and identify time synchronization between the end node 311 and the switch 310 based on the time difference. For example, in a case that the calculated time difference is not larger than a predetermined value, the end node 311 may be determined as synchronized with the switch 310. On the contrary, in a case that the calculated time difference exceeds the predetermined value, the end node 311 may be determined as not synchronized with the switch 310.

Also, the end node 311 may identify a communication node which is not synchronized based on the asynchronous MAC address and the time over flag included in the third synchronization frame. For example, in a case that the time over flag field of the third synchronization field is set to '1', the end node 311 may identify that the communication node indicated by the corresponding asynchronous MAC address field 812 is in asynchronous state. Then, the end node 311 may again perform a time synchronization procedure with the communication node determined as not synchronized.

The methods according to forms of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first end node in an Ethernet-based vehicle network, the method comprising:
   performing time synchronization between the first end node and a bridge which is connected to a second end node and a third end node;
   transmitting a first frame requesting verification of the time synchronization to the bridge;
   receiving, from the bridge, a second frame in which a link delay time of the bridge, first synchronization information of the second end node, and second synchronization information of the third end node are multiplexed, the first synchronization information includes a flag indicating whether the second end node connected to the bridge is in a synchronous state or an asynchronous state and an identifier of the second end node having a state indicated by the flag included in the first synchronization information, and the second synchronization information includes a flag indicating whether the third end node connected to the bridge is in the synchronous state or in the asynchronous state and an identifier of the third end node having a state indicated by the flag included in the second synchronization information;
   receiving a third frame including a transmission time of the second frame from the bridge; and
   verifying the time synchronization between the first end node, the second end node, the third end node, and the bridge based on the link delay time, the first synchronization information, the second synchronization information, and the transmission time.

2. The operation method according to claim 1, wherein the verifying of the time synchronization comprises:
   determining a sum of the link delay time and the transmission time as a time of the bridge; and
   verifying the time synchronization based on a difference between a time of the first end node and the time of the bridge.

3. The operation method according to claim 2, wherein:
   the first end node is determined as synchronized with the bridge when the difference does not exceed a predetermined value, and
   the first end node is determined as not synchronized with the bridge when the difference exceeds the predetermined value.

4. The operation method according to claim 1, further comprising:
   transmitting a fourth frame including a result of the verification of the time synchronization to a fourth end node; and
   transmitting a fifth frame including a transmission time of the fourth frame to the fourth end node.

5. The operation method according to claim 4, wherein the result of the verification includes a flag indicating the synchronous state or the asynchronous state and an identifier of the fourth node having a state indicated by the flag included in the fourth frame.

6. The operation method according to claim 4, wherein the fourth frame further includes a link delay time of the first end node.

7. The operation method according to claim 1, wherein the first end node is a master node.

8. The operation method according to claim 1, further comprising performing time synchronization with the second end node when the second end node is in the asynchronous state.

9. An operation method of a bridge in an Ethernet-based vehicle network, the method comprising:
   performing time synchronization between the bridge and end nodes connected to the bridge;
   receiving a first frame requesting verification of the time synchronization from a first end node connected to the bridge;
   transmitting a second frame in which a link delay time of the bridge, first synchronization information of a second end node connected to the bridge, and second synchronization information of a third end node connected to the bridge are multiplexed, the first synchronization information includes a flag indicating whether the second end node is in a synchronous state or an asynchronous state and an identifier of the second end node having a state indicated by the flag included in the first synchronization information, and the second synchronization information includes a flag indicating whether the third end node is in the synchronous state or in the asynchronous state and an identifier of the third end node having a state indicated by the flag included in the second synchronization information; and transmitting a third frame including a transmission time of the second frame to the first end node.

10. The operation method according to claim 9, wherein the first end node is a master node.

* * * * *